Nov. 17, 1970 G. E. PFANNER 3,540,252
METHOD OF FORMING CYLINDRICAL BODIES HAVING LOW STRESS
EXTERIOR SURFACES
Filed Aug. 12, 1968 2 Sheets-Sheet 1

INVENTOR
GUNTHER E. PFANNER

BY *Darby & Darby*

ATTORNEYS

INVENTOR
GUNTHER E. PFANNER

BY *Darby & Darby*

ATTORNEYS

United States Patent Office 3,540,252
Patented Nov. 17, 1970

3,540,252
METHOD OF FORMING CYLINDRICAL BODIES HAVING LOW STRESS EXTERIOR SURFACES
Gunther E. Pfanner, Huntington, N.Y., assignor to Fairchild Hiller Corporation, Farmingdale, N.Y., a corporation of Maryland
Filed Aug. 12, 1968, Ser. No. 751,880
Int. Cl. B21d 5/14
U.S. Cl. 72—166                        4 Claims

ABSTRACT OF THE DISCLOSURE

A cylindrical body is formed by plastically deforming a sheet of metal to a radius of curvature less than the radius of curvature at which the yield strength of the material is exceeded. The plastically contoured sheet is permitted to elastically return to a cylindrical shape in which the radius of curvature is greater than the desired radius of curvature with the stresses in the exterior surface of the sheet being such that when the sheet is elastically draped to the desired contour, the stresses in the surfaces of the sheet are minimized.

---

The present invention relates to the forming of cylindrical objects such as the skin of an aircraft or the like.

In forming the cylindrical skin of an aircraft fuselage it is extremely important that the stresses at the interior and exterior surfaces of the skin be as low as possible. One common method of achieving a low stress sheet involves an expensive and time consuming heat forming process. Where a sheet is to be formed cold, two basic processes are employed. The first involves a simple elastic draping to the desired contour which results in tension stresses at the exterior surface of the cylinder and compression stresses at the interior surface of the cylinder. The second process is a plastic contouring process which involves bending or rolling the sheet so that the yield point of the sheet is exceeded, thereby plastically deforming the sheet, and permitting the sheet to spring back to the desired contour. With this plastic contouring process, the formed cylindrical sheet has compression stresses at its exterior surface and tension stresses at its interior surface. In both of the foregoing processes the stresses existing at the surfaces of the finally contoured cylindrical sheet may be higher than desired.

The present invention combines certain features of both of the elastic and plastic contouring processes discussed above so as to provide a contouring process such that, by suitable selection of the system parameters, a cylindrical surface can be formed in which the stresses at the surface are zero or very close thereto. The invention may be used to form a single curvature or as part of a process for forming a surface having a compound curvature.

Briefly, in accordance with the invention, a stress-free, flat skin is bent to a first radius which causes a plastic deformation of the sheet. The sheet is then permitted to spring back to an intermediate radius of curvature which is greater than the radius of curvature of the desired cylinder. This intermediate radius of curvature is such that the stresses in the surfaces of the sheet are substantially nullified when the sheet is elastically draped to the desired final contour.

Figure 1:
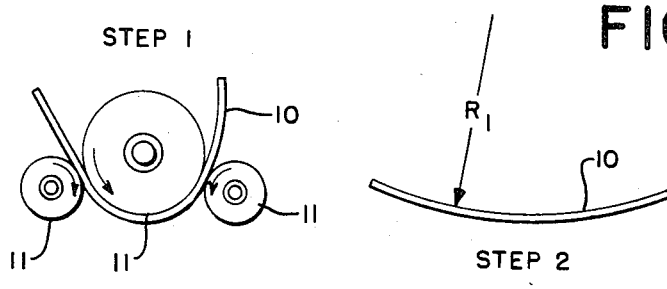
FIG. 1 is a block diagram showing the steps employed in practicing the invention.

In FIG. 1, a flat metal sheet is shown at 10 prior to contouring. As the first step in the process, the sheet 10 is bent by feeding it through standard rollers 11 so as to plastically deform the sheet. In the second "step," the sheet is permitted to spring back to a radius of curvature $R_1$. Finally, the sheet is elastically contoured to the desired final radius $R_2$, as shown in Step 3, where $R_2$ is less than $R_1$. By suitably selecting the radius $R_1$, the finally contoured sheet will have very low stresses at the two surfaces of the sheet.

Figure 2A:
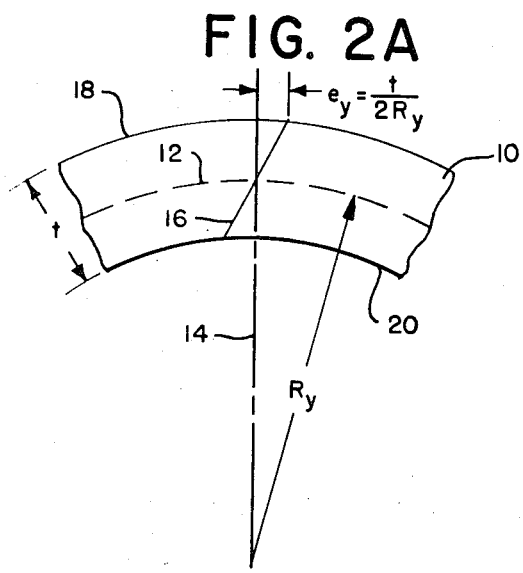
FIGS. 2A and 2B show the stress and strain relationships existing across the neutral plane of a sheet which is rolled to a radius of curvature such that the yield point of the material is just met but not exceeded.
Figure 5A:
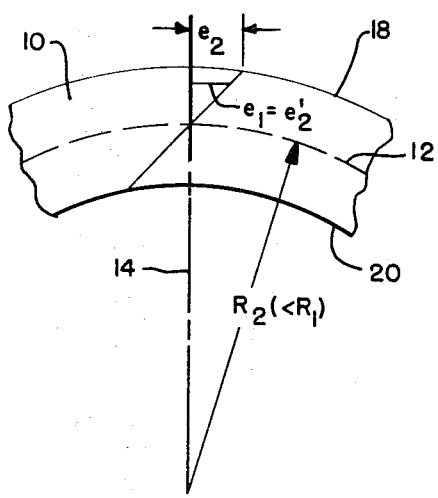
FIGS. 5A and 5B are neutral plane strain and stress diagrams of the sheet after it has been elastically draped to the desired final contour.

The invention is most readily understood with reference to the neutral plane stress and strain diagrams of FIGS. 2A and B through FIGS. 5A and B.

Figure 2B:
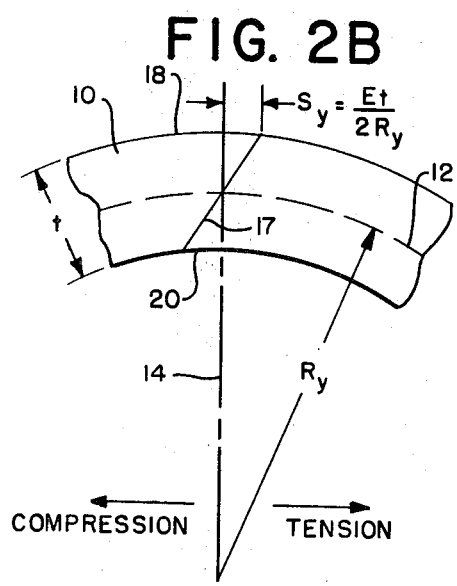

FIGS. 2A and 2B show respectively the strain and stress existing in a sheet 10 which has been rolled or bent to a radius of curvature $R_y$, where $R_y$ is just insufficient to exceed the elastic limit of sheet 10. For purposes of explanation, the radius $R_y$ may be considered as the minimum radius of curvature prior to yielding. In the diagrams of FIGS. 2A and B to FIGS. 5A and B, the neutral plane of the sheet is shown at 12 by a dashed line and represents the plane within the sheet at which the strain or stress, as the case may be, is equal to zero. In these diagrams, elongation and tension stresses are represented to the right of the origins 14 of the illustrated curves. A diminution in length and compression stresses are represented to the left of the origins 14. The curves which represent the strain and stress in FIGS. 2A and 2B, respectively, are shown at 16 and 17.

FIGS. 2A and 2B indicate that where a metal sheet of thickness $t$ is bent to a radius $R_y$, such that the elastic limit of the material is closely approached but not exceeded, the strain $e_y$ at the surfaces 18 and 20 of the sheet 10 is equal to $t/2R_y$. The stress $S_y$ at the surfaces 18 and 20 of sheet 10 is equal to $Et/2R_y$ where E equals the elastic modulus of sheet 10. The equations and diagrams of FIGS. 2A and 2B are well known.

According to the invention, the sheet 10 is plastically deformed to a radius of curvature $R_0$, which is less than $R_y$, thereby exceeding the elastic limit of the material. Under these circumstances, the strain and stress relationships of FIGS. 3A and 3B will prevail in the material of sheet 10. As shown in FIG. 3B, the compression and tension forces beyond the planes 22, 23 do not substantially increase beyond $S_y$, although, as known, the stress $S_0$, at the outer surfaces slightly greater than the stress $S_y$.

Figure 4A:
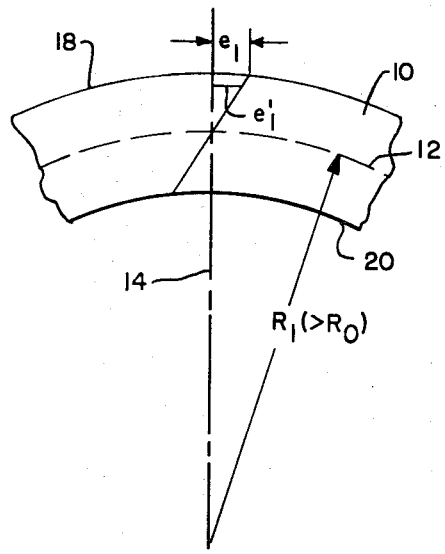
FIGS. 4A and 4B are neutral plane strain and stress diagrams of the sheet after it has been permitted to spring back to its intermediate contour.
Figure 4B:
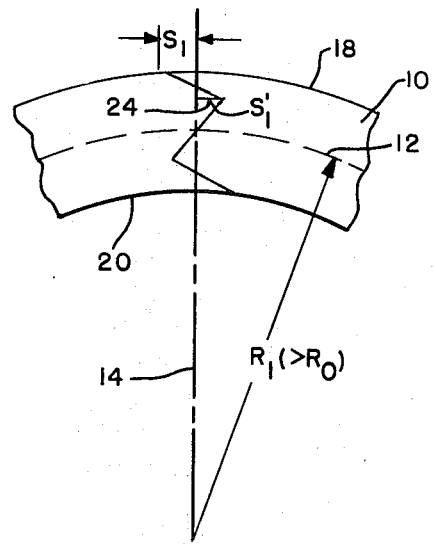

If the bending force which causes the plastic deformation of sheet 10 is removed, the stresses within the sheet 10 will redistribute themselves and the sheet will spring back to a radius of curvature $R_1$, which, of course, is greater than $R_0$, the radius of curvature when sheet 10 is bent beyond its elastic limit. The redistributed stresses in sheet 10 are shown in FIG. 4B. On either side of neutral plane 12 both tension and compression stresses exist within the sheet 10. At the surfaces 18 and 20 of sheet 10, compression and tension stresses represented by $S_1$ exist. This, then, is opposite the stresses existing upon the normal elastic deformation as represented in FIGS. 2A and 2B.

The last step in the process of the invention is to drape the sheet 10 to the desired radius of curvature $R_2$. This final step is an elastic draping process, i.e., the elastic yield of sheet 10 is not exceeded, and therefore it is possible to reduce the stress $S_1$ (FIG. 4B) to approximately zero, since the pure elastic draping (as shown in FIG. 2B) produces tension forces in the outer surface 18 and compression forces in the inner surface 20 which cancel the stresses (FIG. 3B) which exist upon release of the plastically deformed sheet.

From the foregoing explanation, it is apparent that if the radius of curvature $R_1$ is properly selected so that the stress $S_1$ in the outer surfaces 18 and 20 will be exactly reduced to zero by elastically draping the sheet 10 to the desired radius of curvature $R_2$, the final result will be a cylindrical surface in which the surface stresses are at least extremely low and nominally equal to zero. This can be done by calculating the radius $R_1$ as shown in the appendix attached hereto, wherein Equation 2 can be used to determine the value of the strain $e_1$. Since $R_1$ equals $t/2e_1$ (as defined in the Appendix), it is then a simple matter to determine the desired value of $R_1$ which will result in the final curvature $R_2$ in which the outer stresses are equal to zero.

Figure 3A:
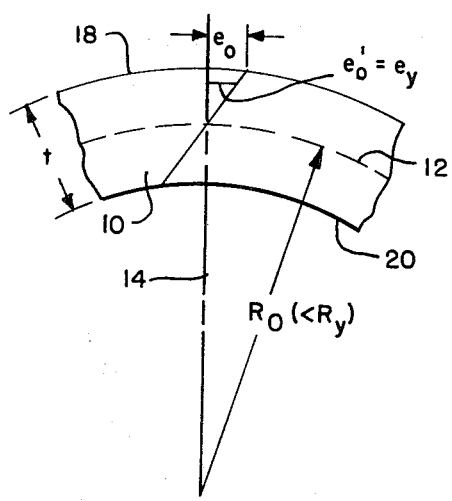
FIGS. 3A and 3B are neutral plane strain and stress diagrams of a sheet after it has been rolled or bent beyond the yield point of the material.
Figure 3B:
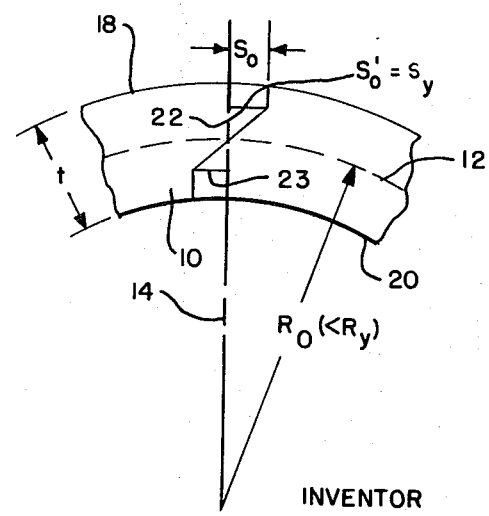

In the preferred embodiment of the invention, a rolling load is applied to plastically deform the sheet 10 to the conditions illustrated in FIGS. 3A and 3B. This is a standard technique and involves feeding the sheet through rollers (such as rollers 11 in FIG. 1) which are properly adjusted relative to each other so as to bend the sheet 10 as it passes through the rollers. Hence, if the desired radius $R_1$ is known, the sheet which is to be curved is fed through the rollers (which may or may not be adjusted, as the need arises) until it comes out of the rollers with a measured radius of curvature $R_1$. When this condition exists, the sheet may be elastically draped onto the aircraft or other supporting frame, in which case the conditions illustrated in FIGS. 5A and 5B will exist. For purposes of this invention, the steps of rolling and bending about a frame are considered full equivalents; the term "bending" being used to describe both of these forming processes.

Figure 6:
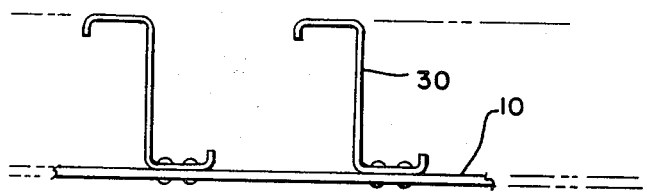
FIG. 6 is a cross-sectional view showing an additional feature of the invention.

The process, according to the invention, is intended specifically for the purpose of forming a cylindrical skin of particular utility for use with aircraft. Hence, it is generally desirable to add longeron stiffeners to the sheet for reasons which are well known in the art. As a corollary to the present invention, it is proposed to rivet such stiffeners to the plastically deformed sheet in its intermediate stage (as represented in FIGS. 4A and 4B) prior to the final draping of the sheet to the desired curvature $R_2$. The arrangement of the longeron stiffeners may be pursuant to standard practices. However, according to this additional feature of the invention, the attachment of the stiffeners prior to the final contouring step has been shown to prevent buckling of the sheet 10. A cross-section view of the sheet 10 with a Zee longeron 30 applied is shown in FIG. 6.

In the following Appendix, Part I is a mathematical derivation of the equations necessary to determine the intermediate radius $R_1$. Part II states representative values which may result in the practice of the invention. The preferred material and the material to which the subsequent appendix refers, is commercially known as Titanium 6-4, which is an annealed alloy, Ti=6Al=4V. However, the principles of the invention are generally applicable to all metals of sufficient ductility to permit rolling (e.g. aluminum and stainless steel). Part III is a definition of the terms used in the specification.

APPENDIX

Under Rolling (or Bending) Load—FIGS. 3A and 3B:

$$e_0' = e_y \qquad S_0' = Ee_0' = Ee_y$$
$$S_0 = S_0' + E'(e_0 - e_y)$$
$$S_o = Ee_y + E'(e_0 - e_y)$$

where $E$=elastic modulus
$E'$=plastic modulus

Upon Release of Load—FIGS. 4A and 4B:

$$e_1 = \frac{t}{2R_1} \qquad S_1 = Ee_1 - (E-E')(e_o - e_y)*$$

$$e'_1 = \frac{t}{2R_1}\left(\frac{e_y}{e_o}\right) \qquad S_1' = Ee_1\left(\frac{e_y}{e_o}\right)$$

Figure 5B:
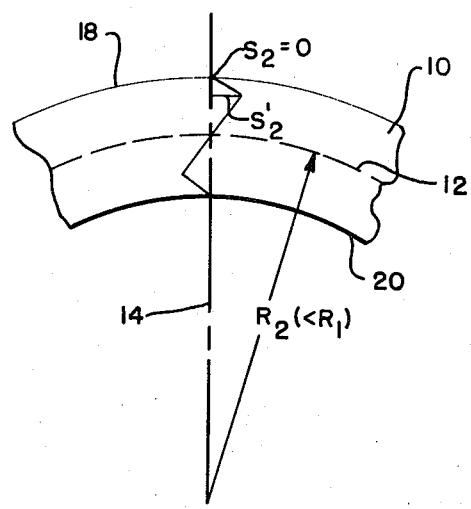

After Elastic Draping (Final Condition)—FIGS. 5A and 5B:

$$e_2 = \frac{t}{2R_2} \qquad S_2 = S_1 + E(e_2 - e_1) = 0$$

$$S_2 = Ee_1 - (E-E')(e_o - e_y) + E(e_2 - e_1) = 0$$

$$e_2' = \frac{t}{2R_2}\left(\frac{e_y}{e_o}\right) \qquad S_2' = Ee_2\left(\frac{e_y}{e_o}\right)$$

Calculation of Radius $R_1$
From the preceding:

$$S_2 = Ee_1 + E(e_2 - e_1) - (E-E')(e_o - e_y) = 0$$

or, $$e_o(E-E') = Ee_2 + (E-E')e_y$$

$$\text{Let } k = \frac{E}{E-E'}$$

$$e_o = ke_2 + e_y$$

then, (1) $\qquad\qquad e_o = ke_2 + e_y$ $e_2$ can be computed since $t$, $R_2$ and $e_y$ are known. Hence $e_0$ can be determined from Equation 1.

(2) Since $(2ke_1 + 3e_y)e_0^2 - 2e_0^3 - e_y = 0$, ** $e_1$ can be determined.

Hence, $R_1$ can be computed ($e_1 = t/2R_1$).

Part II

For a typical case (using titanium 6-4) where $R_2=90$ inches, $t=.045$ inch, $E=16\times10^6$ p.s.i., and $E'=1\times10^6$ p.s.i.:

$$e_0 = 7.75125 \times 10^{-5}$$
$$e_1 \cong 1.20239 \times 10^{-5}$$
$$R_1 = 1,871.27 \text{ inches}$$
$$R_{1/t} \cong 41,583$$

Part III.—Definition of terms $R_y$=Radius of curvature of sheet of given thickness at the instant of yielding.
$e_y$=Yield strain.
$S_y$=Yield stress.
$R_0$=Radius of curvature under load conditions where yield point is exceeded (i.e. $R_0 < R_y$).
$R_1$=The radius of curvature after removal of the load which caused permanent deformation $R_1 > R_0$.
$e_0$=The maximum outer fiber strain under load.
$e_1$=The maximum outer fiber strain after load removal (springback).
$S_1$=The upper surface residual stress after load removal ($S_1$ is a compressive stress in this surface).
$S_1'$=Maximum interior residual stress after load removal $S_1'$ is opposite in sign to $S_1$ (when considering one side of the neutral axis).
$e_2$=Outer fiber strain induced by elastic draping.

---
* For derivation of this equation see "Determination of Residual Stresses in Cold-Bent Sheet," Jan. 4, 1956, ERMR-3161, C. Raphael, Republic Aviation Corporation.
** See "Determination of Residual Stresses in Cold-Bent Sheet" supra.

$R_2$ = The radius of curvature induced by elastic draping (i.e. $e_2 = t/2R_2$) $R_2 < R_1$.

$e_2 - e_1$ = The increment of strain which when impressed upon the sheet causes it to deform (elastically) from a radius of curvature $R_1$ to a radius of curvature $R_2 < R_1$.

$S_0$ = Outer fiber stress under load.

What is claimed is:

1. The method of forming a cylindrical surface having outer surfaces of low stress and having a radius of curvature of $R_2$, comprising the steps of bending a metal sheet to a radius of curvature of $R_0$ where $R_0$ is less than the radius of curvature of said sheet at which the elastic yield thereof is exceeded, permitting said sheet to elastically return to a radius of curvature of $R_1$ where $R_1$ is greater than $R_0$ and less than $R_2$, $R_1$ being selected so that when said sheet is subsequently elastically deformed to said radius of curvature $R_2$, the stress in the outer surfaces of said sheet is reduced to a desired level, and thereafter elastically deforming said sheet to said radius of curvature $R_2$.

2. A method of forming a cylindrical surface according to claim 1, wherein stiffener members are secured to said sheet before elastically deforming it to the radius of curvature $R_2$.

3. A method of forming a cylindrical surface according to claim 2, wherein said stiffener members are riveted to said sheet after it has returned to a radius of curvature $R_1$.

4. A method of forming a cylindrical surface according to claim 1, wherein said step of bending comprises the step of continually passing said metal sheet through rollers until the measured radius of curvature of the sheet is equal to $R_1$.

References Cited

UNITED STATES PATENTS

| | | | |
|---|---|---|---|
| 642,612 | 2/1900 | Kleber et al. | 72—168 |
| 1,387,199 | 8/1921 | Small | 72—368 |
| 1,872,276 | 8/1932 | Graham | 72—368 |

LOWELL A. LARSON, Primary Examiner

U.S. Cl. X.R.

72—368, 379